United States Patent
Raniere

(10) Patent No.: US 8,508,363 B2
(45) Date of Patent: Aug. 13, 2013

(54) SYSTEMS AND METHODS FOR PERMITTING MOVEMENT OF AN OBJECT OUTSIDE A PREDETERMINED PROXIMITY DISTANCE THRESHOLD

(75) Inventor: Keith A Raniere, Clifton Park, NY (US)

(73) Assignee: First Principles, Inc., Albany, NY (US)

( * ) Notice: Subject to any disclaimer, the term of this patent is extended or adjusted under 35 U.S.C. 154(b) by 377 days.

(21) Appl. No.: 12/466,432

(22) Filed: May 15, 2009

(65) Prior Publication Data

US 2010/0289646 A1   Nov. 18, 2010

(51) Int. Cl.
*G08B 1/08* (2006.01)

(52) U.S. Cl.
USPC .......... 340/539.32; 340/572.1; 340/686.6

(58) Field of Classification Search
USPC .......... 340/572.1, 572.7, 571, 573.3, 573.4, 340/539.32, 539.13, 686.6
See application file for complete search history.

(56) References Cited

U.S. PATENT DOCUMENTS

| | | | |
|---|---|---|---|
| 4,260,982 A | 4/1981 | DeBenedictis et al. | |
| 5,357,254 A | 10/1994 | Kah, Jr. | |
| 5,497,149 A | 3/1996 | Fast | |
| 5,552,773 A | 9/1996 | Kühnert | |
| 5,589,821 A | 12/1996 | Sallen et al. | |
| 5,612,675 A | 3/1997 | Jennings et al. | |
| 5,689,240 A | 11/1997 | Traxler | |
| 6,084,517 A * | 7/2000 | Rabanne et al. | ........... 340/573.4 |
| 6,462,658 B1 | 10/2002 | Bender | |
| 6,542,080 B2 | 4/2003 | Page | |
| 6,847,892 B2 | 1/2005 | Zhou et al. | |
| 6,889,135 B2 | 5/2005 | Curatolo et al. | |
| 7,002,473 B2 | 2/2006 | Glick et al. | |
| 7,061,381 B2 | 6/2006 | Forcier et al. | |
| 7,274,292 B2 | 9/2007 | Velhal et al. | |
| 2004/0046657 A1 | 3/2004 | Ziesing | |

FOREIGN PATENT DOCUMENTS

| | | |
|---|---|---|
| BE | 894079 | 2/1983 |
| CH | 657466 | 8/1986 |
| DE | 2455259 | 5/1976 |
| WO | 9325983 | 12/1993 |

\* cited by examiner

*Primary Examiner* — Thomas Mullen
(74) *Attorney, Agent, or Firm* — Schmeiser, Olsen & Watts, LLP

(57) ABSTRACT

Systems and methods for permitting movement of an object not detected within a predetermined proximity distance threshold, the systems and methods comprising registering at least one object with a device; tracking the at least one object with the device; allowing at least one object not detected within a predetermined proximity distance threshold; and reregistering the at least one object with the device once the object has returned inside the predetermined proximity distance threshold.

24 Claims, 7 Drawing Sheets

| RFID CODE | ITEM DESCRIPTION | OBJECT PREDETERMINED PROXIMITY THRESHOLD (ft) |
|---|---|---|
| 0000000001 | COMPUTER NOTEBOOK | 5 |
| 0000000010 | GLASSES | 5 |
| 0000000011 | HAT | 1 |
| 0000000100 | WALLET | 1 |
| 0000000101 | CAR KEYS | 2 |
| ... | ... | ... |

FIG. 4

SYSTEMS AND METHODS FOR PERMITTING MOVEMENT OF AN OBJECT OUTSIDE A PREDETERMINED PROXIMITY DISTANCE THRESHOLD

BACKGROUND OF THE DISCLOSURE

The present disclosure relates generally to systems and methods for managing the location of at least one object. In particular, the present disclosure includes a warning device for detecting the location of at least one object with respect to a predetermined proximity distance threshold relative to the device operatively positioned proximate a communication device.

In today's society, people rely on many objects for activities such as work, school, travel and recreation. Sometimes the objects needed for an activity may not be readily located causing a person to frantically search for the missing objects before leaving for the activity. Other times these objects may be completely forgotten by a person resulting in the person leaving for an activity without one or more objects.

As one example, when leaving for work, a person may need to remember and locate a wallet, automobile keys, laptop computer, employee badge, purse etc. In another example, when leaving for an overseas trip, a person may need to remember and locate objects associated with international travel, such as passports, visas, foreign currency, etc. Any one of these objects may inadvertently be forgotten or may be difficult to locate.

SUMMARY OF THE DISCLOSURE

The systems and methods of the present disclosure may have specific utility for a person that loses their keys, glasses, wallet, and books etc. sometimes as often as every single day. So, in order to permit at least one selected object to not be detected within a predetermined proximity distance threshold from a device closely associated with the person, the person must instruct the device to give permission for the specific selected object to not be detected within the predetermined proximity distance threshold relative to the device or a warning notification will be generated to that effect, although the scope of the disclosure is not limited in this respect.

For example, objects such as glasses or keys, in accordance with the present disclosure, may be normally detected within the predetermined proximity distance threshold, for example, about a quarter foot to about 10 feet away (or any practicable distance) from the device without a warning notification being generated by the device unless the person takes steps to instruct the device to specifically permit such object or objects to not be detected within the predetermined proximity distance threshold. Without such permission having been received by the device, a person that unconsciously positions at least one object at a location and then moves to another location such that the at least one object is not detected within the predetermined proximity distance threshold relative to the device, the device would normally generate a warning notification that the object was not detected within the predetermined proximity distance threshold. In other words, the system and methods of the present disclosure will not permit a person to just move to a location such that a object is not detected within the predetermined proximity location boundary between the device and the object without the person being notified in some manner, although the scope of the disclosure is not limited in this respect.

The above of course is predicated on the prerequisite that the person has the device closely associated with his or her person and that the device is placed in an operable mode and has been synchronized such that at least one object and preferably a plurality of objects are registered with the device, although the scope of the disclosure is not limited in this respect.

In some embodiments, once a selected object has been detected to be within the predetermined proximity distance threshold from the device, the device may generate a warning notification only when the selected object is no longer detected within the predetermined proximity distance threshold from the device, thereby preventing the person from accidentally moving to a location such that the selected object is not detected within the predetermined proximity distance threshold from the selected object without the device generating a warning notification, although the scope of the disclosure is not limited in this respect.

In some embodiments, a plurality of objects are registered with the device such that when any one or more of the plurality of objects are not detected within the predetermined proximity distance threshold, which may be programmed to any of the plurality of different predetermined proximity distance thresholds from the device, such as, for example about any where from about 2 feet to any reasonable predetermined proximity distance threshold from the device associated with a person, the device generates a warning notification for the person, although the scope of the disclosure is not limited in this respect.

In certain embodiments, the device may generate different warning notifications for different objects. In other embodiments, the device may be programmed to say "keys", "glasses", etc. via a programmed voice operatively associated with the device, although the scope of the disclosure is not limited in this respect.

For example, if a person desires to place a selected object, for example their keys at a specific location and allow the keys to remain there, indefinitely, the person may instruct the device that the selected object has permission to not be the detected within the predetermined proximity distance threshold by, for example, waving the keys in front of the device or execute some other activity which is operative to inform the device that the specific object has been permitted to not be the detected within the predetermined proximity distance threshold, although the scope of the disclosure is not limited in this respect.

When that object is relocated to a position within the predetermined proximity distance threshold, the device may be operative to automatically re-register that object as being within the predetermined proximity distance threshold or may provide for the person to optionally instruct the device that the specific object is now permitted back within the predetermined proximity distance threshold and that if in the future the object is not detected within the from predetermined proximity distance threshold, the device may generate a warning notification to the person, although the scope of the disclosure is not limited in this respect.

In one specific embodiment, a radio frequency identification (RFID) tag or similar device capable of performing the same or similar function, as would be known to those skilled in the art, may be placed on at least one object or a plurality of objects, although the scope of the disclosure is not limited in this respect.

In another representative embodiment, a device generates a warning notification when one or more of the objects are not detected as being located within a predetermined proximity distance threshold from the device. In order to permit the one or more objects to not be detected within the predetermined proximity distance threshold, it is required that the device be instructed that, if one or more of the objects has permission to not be detected within the predetermined proximity distance threshold from the device, the device does not generate a warning notification, although the scope of the disclosure is not limited in this respect.

In some embodiments, a person may instruct the device not to generate a warning notification when a selected object is not detected within the predetermined proximity distance threshold by notifying the device in such a manner that permission for the specific selected object to not be the detected within the predetermined proximity distance is granted. In such case, no warning notification is generated by the detection of the selected object within the predetermined proximity distance, although the scope of the disclosure is not limited in this respect.

The present disclosure provides systems and methods for granting permission to at least one object to not be detected within a predetermined proximity distance threshold relative to a device.

In other embodiments, the present disclosure provides for reregistering the at least one object with the communication and warning notification generating device once the at least one object is again detected inside the predetermined proximity distance threshold after permission to not be detected within the maximum predetermined proximity distance threshold has been granted, although the scope of the disclosure is not limited in this respect.

In some embodiments, if after having permission to not be detected within the predetermined priority distance threshold, the at least one object is detected within the predetermined priority distance threshold, permission for the at least one object to not be detected within the predetermined priority distance threshold may be revoked.

In other embodiments, if after permission to not be detected within the predetermined priority distance threshold is revoked, the at least one object is not detected within the predetermined priority distance threshold, a warning notification is provided.

In still other embodiments, if after having permission to not be detected within the predetermined priority distance threshold, the at least one object is detected within the predetermined priority distance threshold, permission for the at least one object to not be detected within the predetermined priority distance threshold is revoked and an alarm is sent to a user.

In some embodiments, the at least one object may be re-registered such as, for example, when a person waves the at least one object in front of a device capable of receiving signals therefrom, such as, for example, a transceiver of a registered radio frequency identification tag or other device capable of performing the same function communicates an identifier for the at least one object to the device, although the scope of the disclosure is not limited in this respect.

In some embodiments, a system for managing the location of at least one object comprising: at least one object; at least one communication structure operatively associated with the at least one object; a device having a communication range and capable of communicating with the communication structure of the at least one object, the device being capable of generating a warning notification; a predetermined proximity distance threshold associated with the at least one object; and a device to activate and deactivate the warning notification thus providing permission of the at least one object to leave or enter the predetermined proximity distance threshold.

In other embodiments, the communication structure may further comprise a triangulation structure, which may include radiolocation triangulation between radio towers; Doppler shift structure, which may include a structure emitting sound waves; and Doppler radar.

One aspect of the disclosure is a method for managing the location of at least one object comprising the steps of: providing at least one object; providing communication structure operatively associated with the at least one object; providing a device having a communication range and being capable of communicating with the communication structure of the at least one object within the device communication range, the device having the capability of providing a warning notification; establishing a predetermined proximity distance threshold for the at least one object; providing the warning notification based on the predetermined proximity distance threshold associated with the at least one object; providing a device to activate and deactivate the warning notification thus providing permission of the at least one object to leave or enter the predetermined proximity distance threshold; and at least one of the steps of: a. activating the warning notification to determine location of the at least one object; and b. deactivating the warning notification to permit entry and exit of the at least one object into or out of the predetermined proximity distance threshold.

Another aspect of the disclosure is a system for managing the location of at least one object comprising: at least one object; communication structure operatively associated with the at least one object; a device having a communication range and capable of communicating with the communication structure of the at least one object, the device having the capability of generating a warning notification; a predetermined proximity distance threshold associated with the at least one object; and a device to activate and deactivate the warning notification thus providing permission of the at least one object to leave or enter the predetermined proximity distance threshold.

Still another aspect of the disclosure is a method for managing the location of at least one object comprising the steps of: providing at least one object; providing at least one communication structure operatively associated with the at least one object; providing a device having a communication range and being capable of communicating with the communication structure of the at least one object within the device communication range, the device being capable of providing a warning notification; establishing a predetermined proximity distance threshold for the at least one object; providing the warning notification if the at least one object is not detected within the predetermined proximity distance threshold associated with the at least one object; instructing the device that one of the at least one object has permission to not be detected within the predetermined proximity distance threshold; determining whether or not the at least one object is detected within the predetermined proximity distance threshold; and if the at least one object is not detected within the predetermined proximity distance threshold, determining whether or not the at least one object not detected within the predetermined proximity distance threshold has permission to not be detected within the predetermined proximity distance threshold.

BRIEF DESCRIPTION OF THE DRAWINGS

The disclosure is described with accompanying reference to drawings, in which:

FIG. 4 illustrates an object table having object descriptions in accordance with some embodiments of the present disclosure.

DETAILED DESCRIPTION OF THE DISCLOSURE

Figure 1:
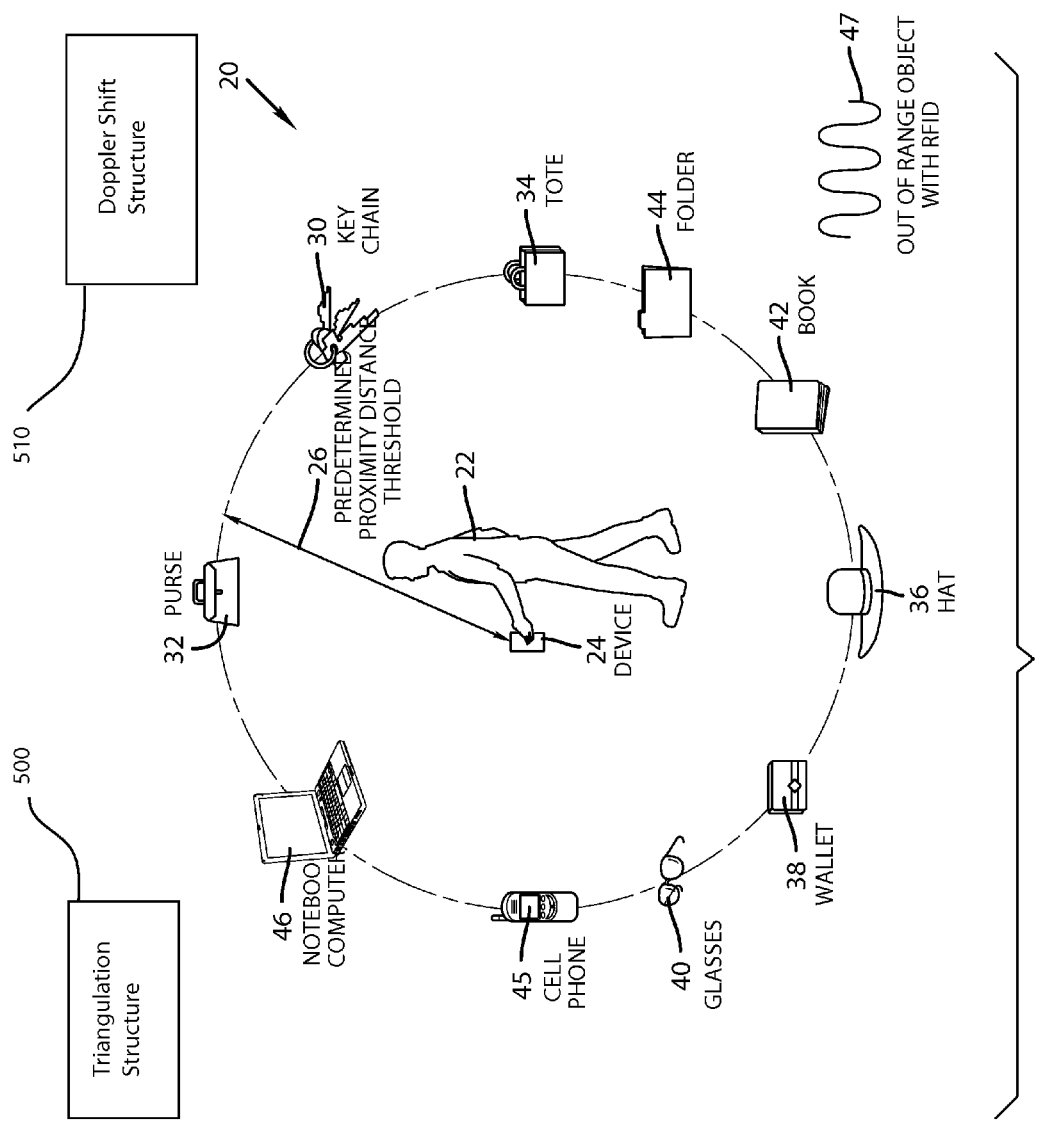
FIG. 1 illustrates a system including a device operatively associated with a person for permitting movement of an object within a predetermined proximity distance threshold relative to the person.

The above-describe systems and methods are believed to be significantly different from some prior art systems and methods that sound an alarm when selected objects (it being understood that each individual object may or may not have its own individual predetermined proximity distance threshold) are not within the predetermined proximity distance threshold (it being understood that the predetermined proximity distance threshold may or may not be varied and that when the term predetermined proximity distance threshold is used in the present disclosure, it is intended that one or more of multiple predetermined proximity distance threshold may be selected at any particular time) and their location is identified by the device so that they can be brought within the selected proximity distance threshold of the device, although the scope of the disclosure is not limited in this respect.

The value of system and methods of the present disclosure is that some people are not aware when they pick up one or more of the objects and thus, the objects may be automatically detected as being within the their own individual predetermined proximity distance threshold, although the scope of the disclosure is not limited in this respect.

As an example of the utility of the present disclosure, the first thing in the morning, a person would locate and activates the device and place it in a convenient location proximate their body and go about their normal morning activities. Subsequently, the person may unconsciously, for example, secure their car keys and locate the car keys within the predetermined proximity distance threshold of the device, without consciously realizing that they have done so. Later the person may unconsciously place the keys in a different location.

In accordance with the present disclosure, a warning notification may automatically be generated because, once a person brings the car keys within the predetermined proximity distance threshold, thereafter the device automatically generates a warning notification even without the person remembering that they had taken control of the car keys by moving the keys within the predetermined proximity distance threshold, much less realize that they had inadvertently placed the car keys in another location and then move to another location wherein the car keys were not detected within the predetermined proximity distance threshold, although the scope of the disclosure is not limited in this respect.

At least one embodiment of the systems and methods of the present disclosure prevents a person from subconsciously putting down a object and walking away by requiring the person to instruct the device that the object has been granted permission not to be detected within the predetermined proximity distance threshold, although the scope of the disclosure is not limited in this respect.

The present disclosure will now be described in association with references to drawings of embodiments. It will be apparent to those skilled in the art that various modifications may be made without departing from the scope of the disclosure.

The following description and the drawings illustrate specific embodiments of the present disclosure sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the disclosure set forth in the claims encompass all available equivalents of those claims. Embodiments of the disclosure may be referred to, individually or collectively, herein by the term "disclosure" merely for convenience and without intending to voluntarily limit the scope of this application to any single disclosure or inventive concept if more than one is in fact disclosed.

FIG. 1 illustrates a system 20 for managing the location of at least one object within a predetermined proximity distance threshold relative to a person in accordance with some embodiments of the present disclosure. Because movable objects or objects may easily be misplaced, lost or forgotten, system 20 may be used to help user 22 remember an object and/or confirm that a specific object or object registered with the device is located within a predetermined proximity distance threshold from the device associated with the person, although the scope of the disclosure is not limited in this respect.

An object in general may alternatively be referred to as a personal object, but may also be referred to as an article, body, gadget, gizmo, item, or substance.

The system 20 may include a device 24 and may include a clip (not shown) or other structure capable of performing the function of attaching the device 24 to the person in accordance with some embodiments of the present disclosure. Such devices are known to those skilled in the art and further elaboration on other specific devices is believed unnecessary. For example, U.S. Pat. No. 7,274,292, to Velhal et al., U.S. Pat. No. 7,002,473, to Glick et al. and U.S. Pat. No. 6,542,080, to Page, the disclosures of which are hereby incorporated by reference to the extent not inconsistent with the present disclosure, are examples of patents disclosing similar systems and methods, although the scope of the disclosure is not limited in this respect.

The system 20 for managing the location of at least one object and possibly a plurality of objects within a predetermined proximity distance threshold 26, the predetermined proximity distance threshold may be a fixed distance or variable from a device 24 having a communication range and being capable of communicating with the communication structure of the at least one object within the device 24 communication range, the device 24 having the capability of providing a warning notification. This device 24 is operatively associated with a person and may further include, for example, an antenna or a transceiver 82 operatively associated with the object or a plurality of possible objects 30, 32, 34, 36, 38, 40, 42, 44, 45 and 46 that may be used for detection. In a broad sense, the device 24 is a location or proximity sensor which uses a wave or signal, such as sound, electromagnetic radiation or an electrostatic field, a transmitter and receiver, a transceiver or a sensor 62. Such devices 24 include, but are not limited to a radio frequency identification (RFID) interrogator (not shown), mobile radio frequency device (M-RFID), mobile item management and identification system (MIMIM), a real time locating system (RTLS), a global positioning system (GPS), optical scanner, an ultra-sound identification system (UIS) or any other device known to those skilled in the art for locating objects using a transmitter, signal and receiver or other proximity, navigation or location sensor or locator presently known or which becomes known in the future to those skilled in the art.

One specific technique that may be utilized in the present disclosure may be radiolocation which may be employed in a wide variety of industrial and military activities. Radar systems often use a combination of time of arrival (TOA) and angle of arrival (AOA) to determine a backscattering object's position using a single receiver. In Doppler radar, the Doppler shift may be also taken into account, determining velocity rather than location (though it helps determine future location). The Doppler shift concept may also be used by structure emitting sound waves etc. A representation of a Doppler shift structure 510 is shown in FIG. 1. The Doppler shift structure 510 may include a doppler radar and a structure emitting sound waves. It should be understood that components of the Doppler shift structure 510 may be operatively associated with the object, in one embodiment.

Real Time Location Systems RTLS using calibrated RTLS, and DTOA, are commercially available. The widely-used Global Positioning System (GPS) may be based on TOA of signals from satellites at known positions.

One specific example of the utilization of radiolocation a for locating objects, such as, for example, a mobile telephone (cell phone) may be based on the cellular telephone via its base stations. Most often, radiolocation may be done through triangulation between radio towers. A representation of a triangulation structure 500 is shown in FIG. 1. The triangulation structure 500 may include radiolocation triangulation between radio towers. It should be understood that components of the triangulation structure 500 may be operatively associated with the object, in one embodiment. The location of the caller or handset or other object can be determined several ways: (1.) AOA requires at least two Towers, locating the caller or the handset at the point where the lines from each tower intersect; (2.) time difference of arrival (TDOA) resp. time of arrival (TOA) works using multilateration, except that it may be the networks that determine the time difference and therefore distance from each tower (as with seismometers); (3.) location signature uses "fingerprinting" to store and recall patterns (such as multipath) which mobile phone signals are known to exhibit at different locations in each cell.

The first two may depend on a line-of-sight, which can be difficult or impossible in mountainous terrain or around skyscrapers. Location signatures actually work better in these conditions however. TDMA and GSM networks such as Cingular and T-Mobile use TDOA. CDMA networks such as Verizon Wireless and Sprint PCS tend to use handset-based radiolocation technologies, which are technically more similar to radionavigation. GPS may be one of those technologies.

Composite solutions, needing both the handset and the network include, but are not limited to: assisted GPS (wireless or TV) allows use of GPS even indoors; Advanced Forward Link Trilateration (A-FLT); Timing Advance/Network Measurement Report (TA/NMR); and Enhanced Observed Time Difference (E-OTD).

Initially, the purpose of any of these in mobile phones was so that the public safety answering point (PSAP) which answers calls to an emergency telephone number can know where the caller is and exactly where to send emergency services. This ability is known within the NANP (North America) as wireless enhanced 911. Mobile phone users may have the option to permit the location information gathered to be sent to other phone numbers or data networks, so that it can help people who are simply lost or want other location-based services. By default, this selection may be usually turned off, to protect privacy.

Representative objects of a plurality of possible objects may include, but are not limited to, a key chain 30, purse 32, tote 34, hat 36, wallet 38, glasses 40, book 42, folder 44, cell phone 45 and notebook computer 46 or any other object that may be desired by a user or person 22 to be located and detected within a predetermined proximity distance threshold 26 from the device 24 associated with the user or person 22 in accordance with some embodiments of the present disclosure, although the scope of the disclosure is not limited in this respect.

In some embodiments, the radio frequency identification (RFID) tag, location device or proximity sensor 80 may be field or distance sensitive to the device 24 of system 20. In other embodiments, the radio frequency identification tag, location device or proximity sensor 80 may be operatively attached to the object, although the scope of the disclosure is not limited in this respect. The radio frequency identification tag, location device or proximity sensor 80 may include an antenna or a transceiver 82 for receiving band signals and outputting radio frequency modulated signals, although the scope of the disclosure is not limited in this respect.

In some embodiments, the proximity sensor 80 may be capable of communicating with the device 24 in any manner described herein above.

In some embodiments, the device 24 and system 20 may be operatively attached to the person's clothing by any number of systems and methods presently known or becomes known in the future to those skilled in the art, although the scope of the disclosure is not limited in this respect.

In some embodiments, system 20 includes a plurality of location devices and proximity sensors 80, such as radiofrequency identification (RFID) tag. Each tag 80 may be associated with one or more objects, as would be understood by those skilled in the art. Device 24 may have circuitry to determine the proximity of the tagged objects based on signal levels of response signals 64, 66. Device 24 may also have circuitry to notify user 22 when certain ones of the tagged objects are not detected as being within the predetermined proximity distance threshold 26. In some embodiments, device 24 may use a received signal strength indicator (RSSI) to determine when tagged objects are not detected as being within a predetermined proximity distance threshold 26. In some embodiments, the circuitry for performing various operations by device 24 may include a combination of software, firmware and/or logic circuitry operating with a processing system, as would be understood by those skilled in the art, although the scope of the disclosure is not limited in this respect. In some embodiments, a warning notification may be generated when certain objects are not detected within the predetermined proximity distance threshold 26. In accordance with some embodiments, RFID tags 80 may be affixed or adhered to objects during an initializing process as would be understood by those skilled in the art. In some embodiments, device 24 maintains a list of objects nearby (i.e., within communication range) by regularly transmitting an interrogation signal to the tags 80, and may further maintain a list of the objects that should be detected within predetermined proximity distance threshold 26, although the scope of the disclosure is not limited in this respect.

In some embodiments, the device 24 may include, but is not limited to, a cellular phone and a head set, although other presently known or known in the future electronic devices may be used. The cellular phone may include a voice input/output control, as is known by those skilled in the art. The cellular phone may generate a warning notification message that a specific object (i.e., key chain, purse, tote, wallet, glasses, book, folder, notebook computer etc.) has not been detected within the predetermined proximity distance threshold 26 from the device, although the scope of the disclosure is not limited in this respect.

In other embodiments, the device 24 may generate a warning notification message when a specific object (i.e., key chain, purse, tote, wallet, glasses, book, folder, notebook computer etc.) has been detected re-entering within the predetermined proximity distance threshold 26 from the device 24, although the scope of the disclosure is not limited in this respect.

In still other embodiments, the device 24 may generate a warning notification message that a specific object (i.e., key chain, purse, tote, wallet, glasses, book, folder, notebook computer etc.) has not been detected within the predetermined proximity distance threshold 26 from the device and/or when a specific object has been detected re-entering within the predetermined proximity distance threshold 26 from the device 24, although the scope of the disclosure is not limited in this respect.

Each location or proximity sensor such as an RFID tag 80 may have a unique identification code associated with the tag, and each tag 80 may generate a response signal in response to an interrogation signal transmitted by a transceiver incorporated into device 24, as is known to those skilled in the art. The response may include the unique identification code associated with the RFID tag, allowing the device 24 to identify the unique tag 80 and the particular object associated therewith. Furthermore, in some embodiments, device 24 may be able to determine the range of the uniquely tagged object from the signal level of the response signal, although the scope of the disclosure is not limited in this respect.

In some embodiments, device 24 may include a storage location or memory element 72 to store a database 100, as would be known to those skilled in the art. The database 100 may include the unique identification code of each of the tags, a description of the associated objects, and predetermined proximity distance threshold 26, which may be associated with each object, although the scope of the disclosure is not limited in this respect.

In some embodiments, device 24 may further comprise a graphical user interface (GUI) to receive additional object descriptions and to assign tag identification codes to objects. In some embodiments, the GUI 76 may display a description of objects that are not detected within the predetermined proximity distance threshold. In some embodiments, device 24 generates a warning notification that notifies user 22 with an alert when objects are not detected within the predetermined proximity distance threshold 26. In some embodiments, the alert, signal or warning notification may be an audio alert (e.g., a beep or other sound), a visual alert, a mechanical alert (e.g., a vibration) and/or a remote alert (e.g., an email or message service alert), although the scope of the disclosure is not limited in this respect.

In some embodiments, user 22, through the GUI 76, may select the objects that are not presently within the predetermined proximity distance threshold 26 but should be within the predetermined proximity distance threshold, and device 24 may generate a warning notification or alert 410 that alerts user 22 when one of the objects that were not within the predetermined proximity distance threshold 26 comes within range. This alert 410 may be distinguishable from the alert used for notifying user 22 when objects are not detected within the predetermined proximity threshold, although the scope of the disclosure is not limited in this respect.

In some embodiments, the RFID tags 80 comprise passive RFID tags, while in other embodiments the RFID tags may comprise active tags.

In some embodiments, the RFID tags may be affixed to objects that may be misplaced by persons needing assistance, such as the elderly or infirm. For example, such objects may include eyeglasses, artificial teeth replacements (e.g., dentures), drugs, hearing aids, etc. (not shown). In some embodiments, the predetermined proximity distance threshold 26 may be adjustable, such as between 10 meters, 3 meters and 1 meter, or any other operable distance to allow user 22 to quickly locate a missing object. In some embodiments, the user may be a person assigned to help find the misplaced or missing objects of another person, for example, in the case of the elderly or infirm, although the scope of the disclosure is not limited in this respect.

Figure 2:
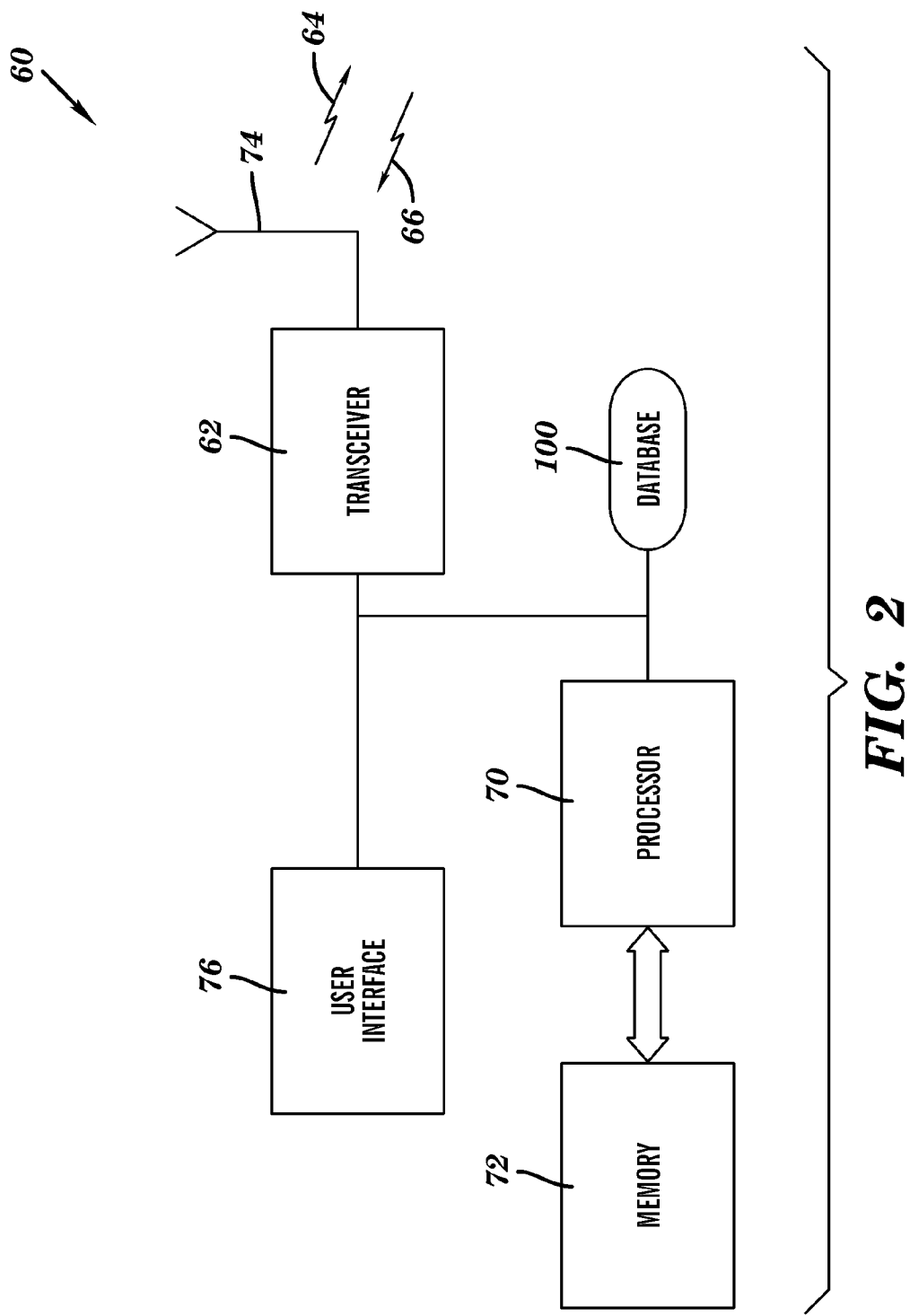
FIG. 2 is a block diagram of a device in accordance with some embodiments of the present disclosure.

FIG. 2 is a block diagram of representative device 60 in accordance with some embodiments of the present disclosure. Device 60 may be suitable for use as device 24, although other configurations for devices may also be suitable. Device 60 may comprise transceiver 62 to transmit interrogation signals 64 to RFID tags and to receive response signals 66 from the RFID tags 80. Device 60 may also comprise processor 70 to determine the proximity of tagged objects based on signal levels of the response signals. In some embodiments, a received signal strength indicator (RSSI) may be used to determine the proximity of the RFID tags, although the scope of the disclosure is not limited in this respect. In some embodiments, processor 70 may be instructed to generate a warning notification capable of notifying a user when certain ones of the tagged objects are not detected within a predetermined proximity distance threshold 26 and/or when certain ones of the tagged objects reenter within a predetermined proximity distance threshold 26, although the scope of the disclosure is not limited in this respect.

In some embodiments, device 60 may include memory 72 and which may maintain a list of objects nearby (i.e., within communication range but not necessarily within a predetermined proximity distance threshold) by regularly transmitting interrogation signal 64. In these embodiments, device 60 may maintain a list 200 (see FIG. 4) of the objects that are within a predetermined proximity distance threshold, although the scope of the disclosure is not limited in this respect.

In some embodiments, device 60 may further comprise antenna 74 coupled to transceiver 62. Antenna 74 may be selected to have characteristics based on a frequency range of RFID tags (FIG. 1). Antenna 74 may comprise a directional or omnidirectional antenna, including, for example, a dipole antenna, a monopole antenna, a loop antenna, a microstrip antenna or other type of antenna suitable for the transmission and/or reception of radio frequency signals with RFID tags (FIG. 1). In some embodiments, antenna 74 may be a patch or a coil antenna, although the scope of the disclosure is not limited in this respect. In some embodiments, when antenna 74 is a patch antenna, the patch antenna may comprise a solid piece of metal or foil. In some embodiments, when antenna 74 is a directional antenna, its directivity may be used to help locate managed objects, although the scope of the disclosure is not limited in this respect.

In some embodiments, device 60 may be part of (or integrated into) a wireless communication device, such as a cellular or wireless telephone, a personal digital assistant (PDA) or a handheld portable communication device, although the scope of the disclosure is not limited in this respect. In some embodiments, the wireless communication device may be a laptop or portable computer with wireless communication capability, a web tablet, a pager, an instant messaging device, a digital camera, an access point or other device that may receive and/or transmit information wirelessly. In some embodiments, the wireless communication device may transmit and/or receive RF communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although the wireless communication device may also be suitable to transmit and/or receive communications in accordance with other techniques including the Digital Video Broadcasting Terrestrial (DVB-T) broadcasting standard, and the High performance radio Local Area Network (HiperLAN) standard, although the scope of the disclosure is not limited in this respect.

Although for some embodiments, device 60 may be described as being part of a wireless communication device, device 60 may be a stand-alone device, while in other embodiments, device may be to him and part of almost any wireless and/or wire line communication device, including a general purpose processing or computing system. In some embodiments, device 60 may be part of be a battery-powered device, although the scope of the disclosure is not limited in this respect.

Although device 60 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein, although the scope of the disclosure is not limited in this respect.

Figure 3:
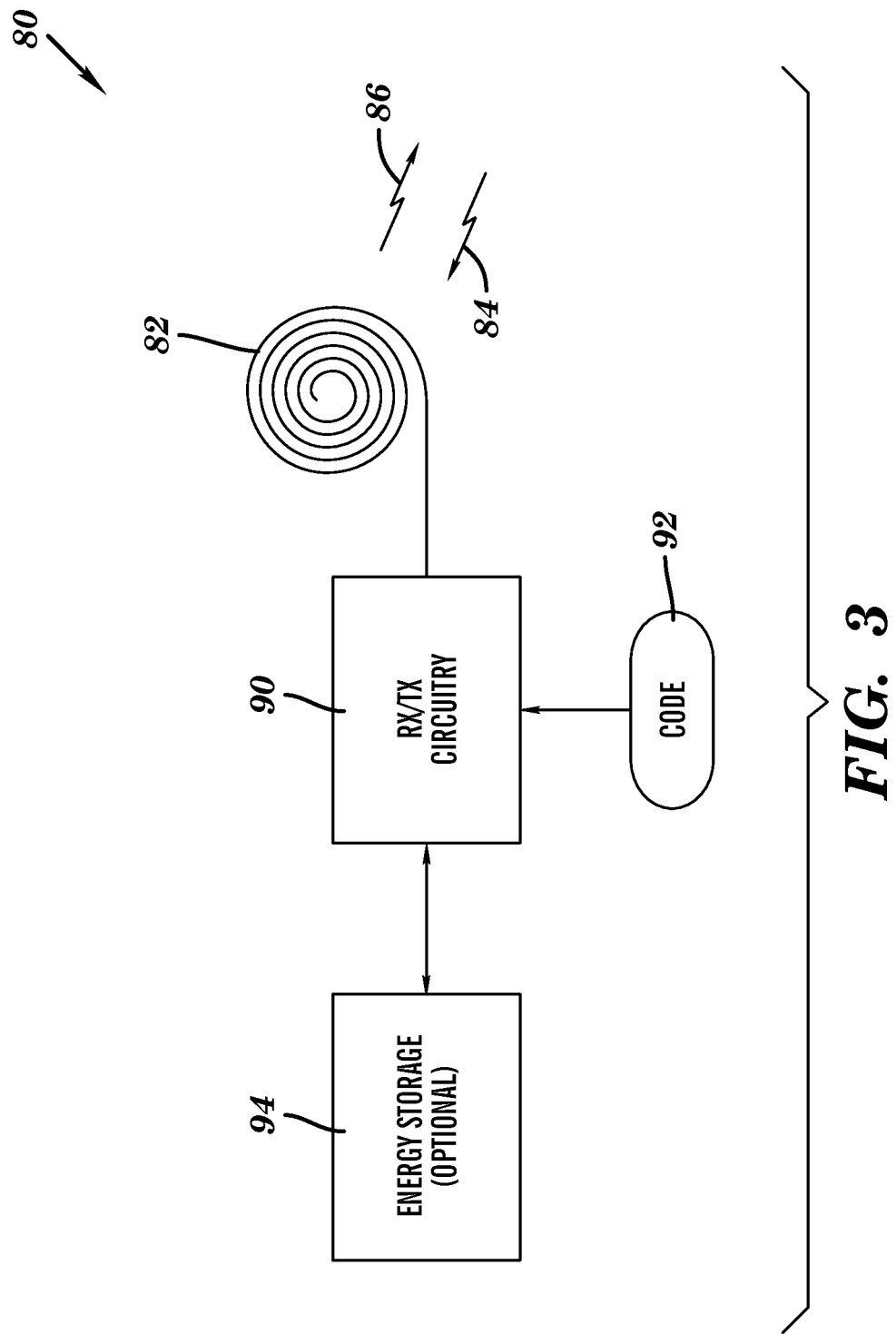
FIG. 3 is a block diagram of a representative radio-frequency identification (RFID) tag suitable for use with some embodiments of the disclosure.

FIG. 3 is a block diagram of a representative radio-frequency identification (RFID) tag 80 suitable for use with some embodiments of the present disclosure. RFID tag 80 may be suitable for use as one or more of tags 80 (FIG. 1), although other tags may also be suitable. RFID tag 80 may include antenna 82 to receive interrogation signals 84 and transmit response signals 86. Interrogation signals 84 may correspond to interrogation signals 64 (FIG. 2), and response signals 86 may correspond to response signals 66 (FIG. 2). RFID tag 80 may also include transceiver circuitry 90 for receiving interrogation signals 84 from antenna 82, and for transmitting response signals 86. Each RFID tag 80 may have unique identification code 92 associated therewith. Antenna 82 may be a coil antenna, although other antennas may also be suitable, although the scope of the disclosure is not limited in this respect.

RFID tag 80 may generate response signal 86 in response to interrogation signal 84 transmitted by device 24 (FIG. 1). Response signal 86 may include unique identification code 92 associated with the particular RFID tag, although the scope of the disclosure is not limited in this respect.

In some embodiments, RFID tag 80 may comprise a passive RFID tag. In these embodiments, the passive RFID tags may use current induced on antenna 82 by interrogation signal 84 to generate the response signal 86. In some embodiments, when RFID tag 80 is a passive tag, no battery is generally included as part of the tag. In these embodiments, interrogation signal 84 may induce a current on antenna 82 to power transceiver circuitry 90 allowing transceiver circuitry 90 to transmit the tag's unique identification code 92 as part of response signal 86. In some embodiments, passive RFID tags may include a capacitive storage element (e.g., storage element 94) which may temporarily store some energy generated from interrogation signal 84, although the scope of the disclosure is not limited in this respect.

In some embodiments, RFID tag 80 may comprise an active RFID tag. In these embodiments, the active RFID tag may use an internal power source to generate response signal 86 in response to interrogation signal 84. In some embodiments, when RFID tag 80 is an active tag, a battery or other energy storage element may be included as part of the tag (e.g., energy storage element 94). In these embodiments, energy storage element 94 may power transceiver circuitry 90 to allow transceiver circuitry 90 to transmit the tag's unique identification code 92 as part of response signal 86. In some embodiments, systems that use active tags may have greater predetermined proximity distance thresholds than systems that use passive RFID tags because response signal 86 generated by an active tag may be more powerful than signals generated by a passive tag. In some embodiments, the predetermined proximity distance thresholds of systems using active RFID tags may be up to 100 feet and even greater. In some embodiments, RFID tag 80, whether active or passive, may include a built-in memory, although the scope of the disclosure is not limited in this respect.

System 20 (FIG. 1) may use either active or passive tags, or any combination of active and passive tags. In some embodiments, RFID tag 80 comprises a low-frequency tag operating at frequencies of ranging between 20 and 150 kHz. In some embodiments, a low-frequency tag may operate at approximately 125 kHz, although the scope of the disclosure is not limited in this respect.

In some embodiments, RFID tag 80 comprises a high-frequency tag operating at frequencies ranging between approximately 10 and 15 MHz. In some embodiments, a high-frequency tag may operate at 13.56 MHz and may have a predetermined proximity distance threshold of about 10 feet, although the scope of the disclosure is not limited in this respect.

In some embodiments, RFID tag 80 comprises an ultra-high-frequency tag operating at frequencies ranging between approximately 800 and 1000 MHz. In some embodiments, the ultra-high-frequency tag may operate at frequencies ranging from approximately 866 to 930 MHz, although the scope of the disclosure is not limited in this respect.

In some embodiments, RFID tag 80 may comprise a microwave frequency tag operating at microwave frequencies ranging between approximately 5 and 6 GHz. In some embodiments, the microwave frequency tag may operate at frequencies of approximately 5.8 GHz and may having a predetermined proximity distance threshold of up to 30 feet, although the scope of the disclosure is not limited in this respect.

FIG. 4 is an object table illustrating object descriptions in accordance with some embodiments of the present disclosure. Object table 200 may be part of database 100 (FIG. 2)

and may be accessible to device 60 (FIG. 2). Table 200 may include unique identification codes 202 of the RFID tags, descriptions 204 of the associated objects, and in some embodiments, predetermined proximity distance threshold 208 associated with each object. In some embodiments, table 200 may be stored in device 60 (FIG. 2), while in other embodiments, table 200 may be stored in an external database which may reside on some other system other than device 60 (FIG. 2), although the scope of the disclosure is not limited in this respect.

In some embodiments, user 22 may select predetermined proximity distance thresholds for objects based on distance (e.g. feet or meters), while in other embodiments, a user may select predetermined proximity distance threshold for objects based on a return signal level. In some embodiments, predetermined proximity distance thresholds may be selected based on the range of the RFID tag 80 associated with the object, as well as the type of object. In some embodiments, the device 24 may provide guidance to the user in selecting predetermined proximity distance thresholds for objects based on the type of object and the range of the tag, although the scope of the disclosure is not limited in this respect.

Figure 5:
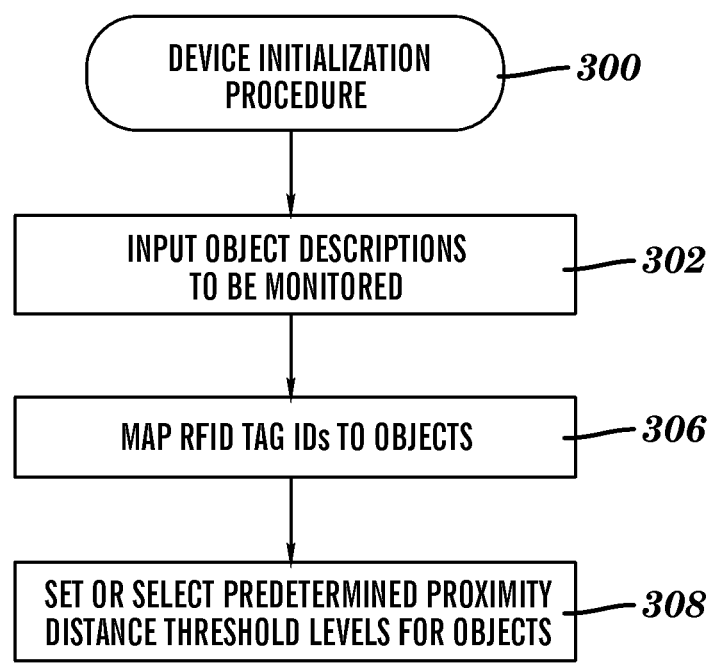
FIG. 5 is a flowchart of a device initialization procedure in accordance with some embodiments of the present disclosure.

FIG. 5 is a flow chart of a device initialization procedure 300 in accordance with some embodiments of the present disclosure. Procedure 300 may be preformed by a device, such as device 24 (FIG. 1), although other systems may also be used to perform procedure 300. Procedure 300 may be used to initialize a device for performing an object management procedure, such as procedure 400 (FIG. 6) described below, although the scope of the disclosure is not limited in this respect.

Operation 302 comprises inputting object descriptions to be monitored. For example, object descriptions 204 (FIG. 4) described in table 200 (FIG. 4) may be input during operation 302, although the scope of the disclosure is not limited in this respect.

Operation 306 may comprise mapping RFID tags to objects. Operation 306 may comprise inputting or reading RFID tag codes, such as identification code 92 (FIG. 3), into the device 24. In some embodiments, a tag reader (not shown) may be used. For example, transceiver 62 (FIG. 2) of the device 60 may read RFID tag codes and the user 22 may associate a tag with one of the object descriptions. In some embodiments, operation 306 may also include affixing or adhering the RFID tags to the objects. In some embodiments, operation 302 may comprise specifying the type of RFID tag associated with an object. The type of tag may, for example, be specified by the user, or in some cases, may be determined by the tag reader when reading the RFID tag codes, although the scope of the disclosure is not limited in this respect.

In some embodiments, operations 302 and 306 may comprise generating a database, such as database 100 (FIG. 2), to include the unique identification code of the RFID tags 80, a description of an associated object, and a predetermined proximity distance threshold associated with each object. In some embodiments, the database may be generated using a graphical user interface, such as graphic user interface (GUI) 76 (FIG. 2), and stored in the device 24, although the scope of the disclosure is not limited in this respect.

Operation 308 may comprise setting predetermined proximity distance threshold levels for the objects. In some embodiments, predetermined proximity distance thresholds may be set based on the type of tag and/or the object associated with the tag, although the scope of the disclosure is not limited in this respect.

Figure 6A:
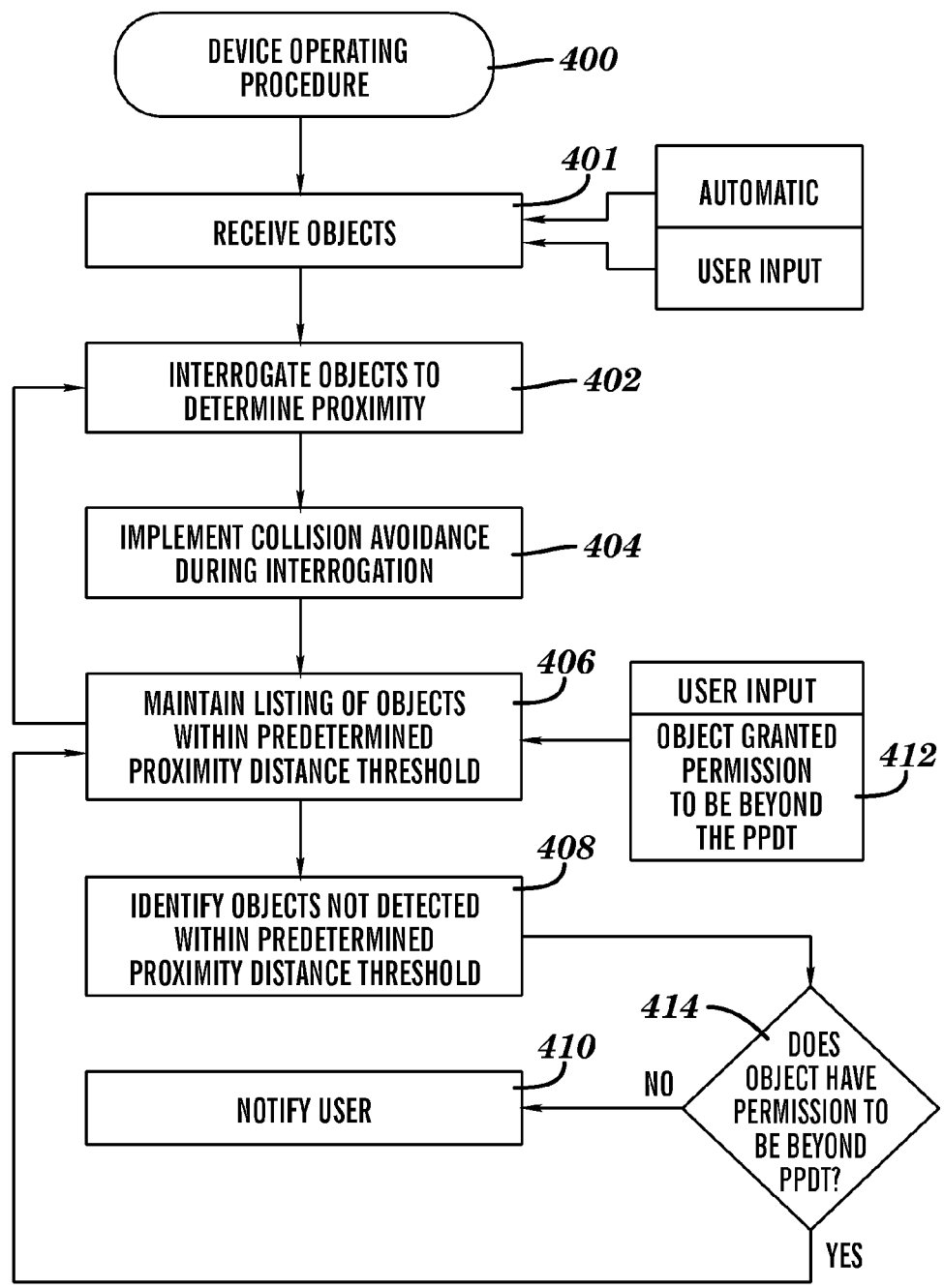
FIG. 6A illustrates a flowchart of a device operating procedure illustrating a method for permitting movement of an object within a predetermined proximity distance threshold, including allowing an object to not be detected within a predetermined proximity distance threshold.

FIG. 6A is a flow chart of a device operating procedure 400 in accordance with some embodiments of the present disclosure. Device operating procedure 400 may be performed by a device, such as device 24 (FIG. 1), for managing a plurality of objects tagged with RFID tags, although the scope of the disclosure is not limited in this respect.

Operation 401 may comprise inputting the objects to be monitored by the device into the device. In some embodiments, operation 401 may automatically input objects into the device 24. In other embodiments, the user may input the objects into the device 24.

Operation 402 may comprise interrogating the RFID tags of tagged objects to determine an object's proximity. In some embodiments, operation 402 may comprise transmitting an interrogation signal 64 (FIG. 2) to be received by the RFID tags, and receiving the response signals, such as response signal 66 (FIG. 2). Each response signal may include a unique identification code associated with one of the RFID tags. In some embodiments, operation 402 may be performed in response to user input. In some embodiments, operation 402 may be performed automatically based on time-of-day, day-of-week and/or location, although the scope of the disclosure is not limited in this respect.

Operation 404 may comprise performing a collision avoidance algorithm to distinguish between response signals received substantially simultaneously from more than one of the RFID tags. In some embodiments, the collision avoidance algorithm may be performed by processor 70 (FIG. 2).

Operation 406 may comprise maintaining a list of objects within the predetermined proximity distance threshold. Operation 408 may comprise identifying objects not detected within a predetermined proximity distance threshold. In some embodiments, a received signal strength indicator (RSSI) of return signals may be used to determine when tagged objects are not detected within the predetermined proximity distance threshold, although the scope of the disclosure is not limited in this respect.

Notification operation 410 may comprise notifying user 22 when one or more of the RFID tagged objects is not detected within a predetermined proximity distance threshold. In some embodiments, operation 410 may comprise notifying user 22 when one or more of the RFID tagged objects is not detected within a predetermined proximity threshold. In other embodiments, operation 410 may comprise notifying user 22 when one or more of the RFID tagged objects is detected reentering the predetermined proximity threshold. In still other embodiments, the alert may be an audio alert (e.g., a beep or other sound), a visual alert, a mechanical alert (e.g., a vibration) and/or a remote alert (e.g., an email or message service alert), although the scope of the disclosure is not limited in this respect.

In some embodiments, operation 408 may comprise determining the proximity of the tagged objects based on signal levels of response signals, and operation 410 may comprise notifying the user 22 when certain ones of the tagged objects are not detected within a predetermined proximity distance threshold based on the signal levels, although the scope of the disclosure is not limited in this respect.

In some embodiments, operation 406 may comprise displaying (e.g., on a GUI 76 or other user display or user interface device) a description of objects that are determined to be not detected within the predetermined proximity distance threshold. In some embodiments, operation 408 may comprise displaying a signal strength indicator for one or more of the tagged objects and notifying the user when one or more of the RFID tagged objects that was not detected within the predetermined proximity distance threshold is within the predetermined proximity distance threshold. In some embodiments, the user may select to have managed objects within the predetermined proximity distance threshold displayed, as well as select to have managed objects not detected within the predetermined proximity distance threshold displayed. In some embodiments, the user may select to be notified when managed objects are within their predetermined proximity distance threshold (instead of not detected within the predetermined proximity distance threshold), although the scope of the disclosure is not limited in this respect.

In some embodiments, operations 402-406 may be performed on a regular basis to monitor the proximity of tagged objects. Although the individual operations of procedures 300 and 400 are illustrated and described as separate operations, one or more of the individual operations may be performed concurrently, and nothing requires that the operations be performed in the order illustrated, although the scope of the disclosure is not limited in this respect.

Returning to FIG. 6A, if the user grants 22 permission for a specific object to not be detected within the predetermined proximity distance threshold, at operation 412, the list of objects to be maintained at operation 406 within the predetermined proximity distance threshold may be modified by the user 22 granting permission to an object to or objects to not be detected within the predetermined proximity distance threshold. Once the device 24 has been notified that an object or objects has permission to not be detected within the predetermined proximity distance threshold. When the specific object is detected at operation 408, if the detected object has permission to not be detected within the predetermined priority distance threshold, the alarm may be bypassed at operation 414 or the alarm may be activated to indicate that the detected object has reentered the predetermined proximity distance threshold, although the scope of the disclosure is not limited in this respect. If the detected object does not have permission to not be detected within the predetermined priority distance threshold, at operation 414, the user 22 is notified at operation 410.

Figure 6B:
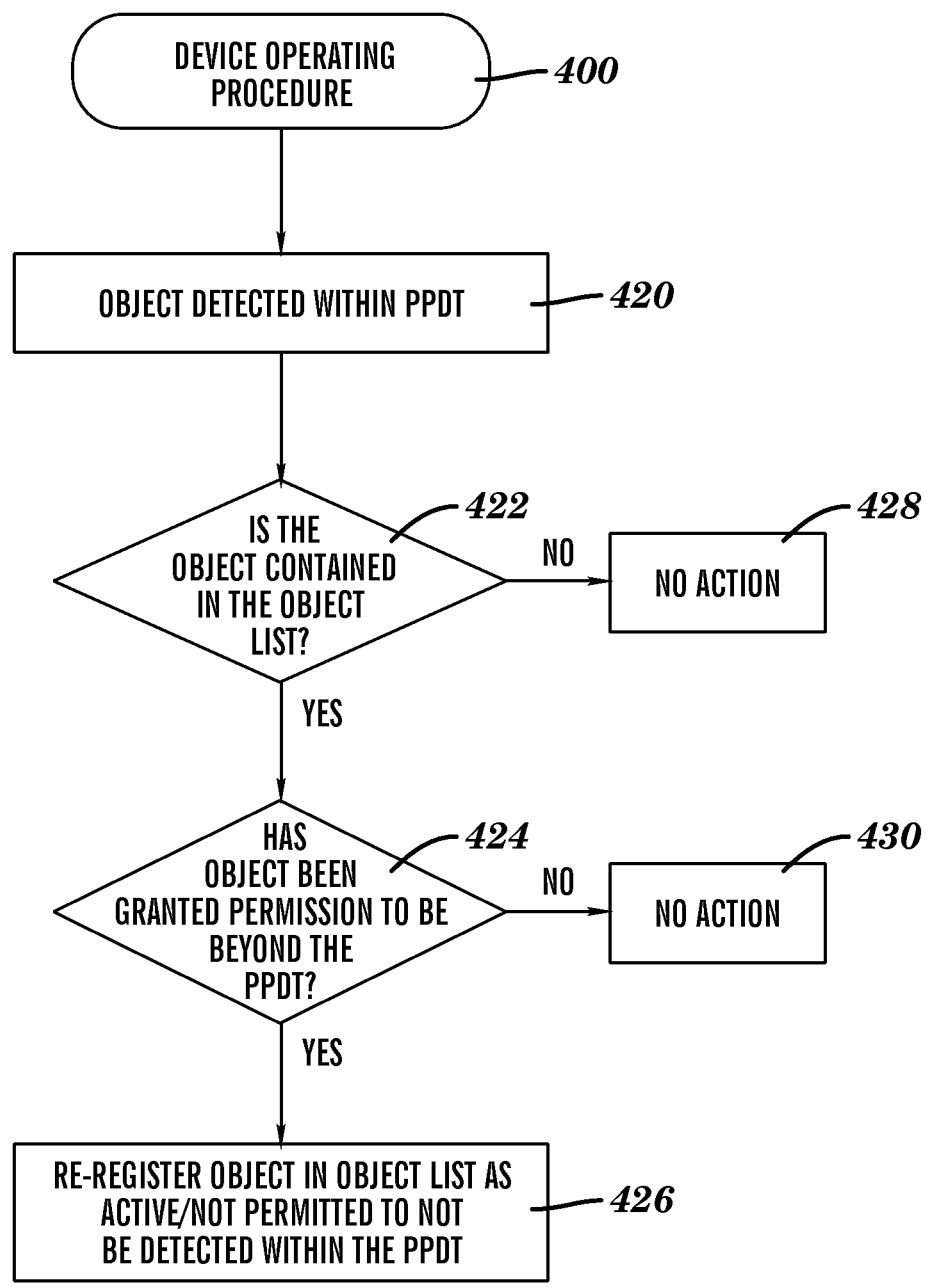
FIG. 6B illustrates a flow chart of a device operating procedure illustrating a method for permitting movement of an object within a predetermined proximity distance threshold, including admitting an object back inside the predetermined proximity distance threshold.

Referring to FIG. 6B, Operation 420 may comprise identifying objects that had been granted permission to not be detected within a predetermined proximity distance threshold that are presently located within the predetermined proximity distance threshold. Once an object is identified by operation 420, whether or not the identified object has been registered in the list of objects maintained within the predetermined proximity threshold at operation 422 is determined. If the answer is yes, at operation 424, it is determined whether or not the identified object has been granted permission to not be detected within the predetermined proximity distance threshold. If the identified object has been granted permission to not be detected within the predetermined proximity distance threshold by the user, the object is reregistered in the object list and an alarm may be sounded notifying the user that the object has been identified as active/permitted to be detected within the predetermined proximity distance threshold at operation 426.

If at operation 422, the object is not contained in the object list, there may be no action at operation 428 or the user may be notified. If at operation 424, the object is determined to have not been granted permission to not be detected within the predetermined proximity distance threshold, no action may be taken at operation 430.

In another embodiment of the disclosure, a method for managing the location of at least one object is provided. The method includes providing at least one object such as key chains 30, purse 32, tote 34, hat 36, wallet 38, glasses 40, book 42, folder 44, cell phone 45 and notebook computer 46 or any other object that may be desired by a person to be located and detected within a predetermined proximity distance threshold 26 from the device 24 associated with the user or person 22 in accordance with some embodiments of the present disclosure, although the scope of the disclosure is not limited in this respect.

A communication structure operatively associated with the at least one object such as a radio frequency identification (RFID) tag, mobile radio frequency device (M-RFID), mobile item management and identification system (MIMIM), a real time locating system (RTLS), a global positioning system (GPS), optical scanner, an ultra-sound identification system (UIS) or any other device that is now known or becomes known in the future to those skilled in the art for locating objects. A device 24 having a communication range and being capable of communicating with the communication structure of the at least one object within the device communication range, the device 24 having the capability of providing a warning notification in accordance with the previously mentioned warning notification devices is provided.

As illustrated in FIG. 1, a predetermined proximity distance threshold 26 for the at least one object is illustrated, the predetermined proximity distance threshold 26 may be the same for all objects, may be different for each object or may vary for some objects relative to other objects. The warning notification is provided based on the predetermined proximity distance threshold associated with the at least one object. As previously described a device to activate and deactivate the warning notification thus providing permission of the at least one object to leave or reenter the predetermined proximity distance threshold is provided. Finally, the warning notification may be activated to determine location of the at least one object; and/or deactivating the warning notification to permit entry and exit of the at least one object into or out of the predetermined proximity distance threshold. Activating the warning notification to determine location of the at least one object may further include the step of moving the at least one object to detect the communication structure; or moving the at least one object outside the predetermined proximity distance or moving the at least one object inside the predetermined proximity distance or moving the at least one communication structure to detect the object; or moving the at least one communication structure outside the predetermined proximity distance; or moving the at least one communication structure inside the predetermined proximity distance or varying the predetermined proximity distance threshold without moving the at least one communication structure or the at least one object to activate the warning notification and thus determine the distance between the at least one communication structure and the at least one object.

In another embodiment, a system 20 for managing the location of at least one object includes at least one object, such as, for example, key chain 30; communication structure or proximity sensor 80 operatively associated with the at least one object 30; a device 24 having a communication range and capable of communicating with the communication structure 80 of the at least one object 30, the device 24 having the capability of generating a warning notification; a predetermined proximity distance threshold associated with the at least one object 30; and a device 24 to activate and deactivate the warning notification thus providing permission of the at least one object to leave or enter the predetermined proximity distance threshold.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof, although the scope of the disclosure is not limited in this respect.

Embodiments of the disclosure may be implemented in one or a combination of hardware, firmware and software. Embodiments of the disclosure may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others, although the scope of the disclosure is not limited in this respect.

The Abstract is provided to comply with 37 C.F.R. Section 1.74(b) requiring an abstract that will allow the reader to ascertain the nature and gist of the technical disclosure. It is submitted with the understanding that it will not be used to limit or interpret the scope or meaning of the claims.

In the foregoing detailed description of the present disclosure, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, disclosure may lie in less than all features of a single disclosed embodiment. Thus the following claims are hereby incorporated into the detailed description of the disclosure, with each claim standing on its own as a separate preferred embodiment.

The invention claimed is:

1. A method for managing the location of at least one object comprising:
   providing at least one object;
   providing at least one communication structure operatively associated with the at least one object;
   providing a device having a communication range and being capable of communicating with the communication structure operatively associated with the at least one object within the device communication range, the device being capable of providing a warning notification;
   establishing a predetermined proximity distance threshold for the at least one object in relation to the device;
   providing the warning notification if the at least one object is not detected within the predetermined proximity distance threshold associated with the at least one object;
   determining whether or not the at least one object is detected within the predetermined proximity distance threshold; and
   if the at least one object is not detected within the predetermined proximity distance threshold, determining whether or not the at least one object not detected within the predetermined proximity distance threshold has permission to not be detected within the predetermined proximity distance threshold; and
   if the at least one object is determined to have permission to not be detected within the predetermined proximity distance threshold, no warning notification is provided; and
   if after having permission to not be detected within the predetermined proximity distance threshold, the at least one object is detected within the predetermined proximity distance threshold, revoking the permission for the at least one object to not be detected within the predetermined proximity distance threshold.

2. The method of claim 1 further comprising the step of:
   if the at least one object is determined not to have permission to not be detected within the predetermined proximity distance threshold, a warning notification is provided.

3. The method of claim 1 further comprising the step of:
   if after permission to not be detected within the predetermined proximity distance threshold is revoked, the at least one object is not detected within the predetermined proximity distance threshold, a warning notification is provided.

4. The method of claim 1 further comprising the step of:
   if after having permission to not be detected within the predetermined proximity distance threshold, the at least one object is detected within the predetermined proximity distance threshold, permission for the at least one object to not be detected within the predetermined proximity distance threshold is revoked and an alarm is sent to a user.

5. The method of claim 1 wherein the communication structure operatively associated with the at least one object includes at least one of:
   a radio frequency identification (RFID) tag, a mobile radio frequency device (M-RFID), a mobile item management and identification system (MIMIS), a real time locating system (RTLS), a global positioning system (GPS), an optical scanner and an ultra-sound identification system (UIS).

6. A system for managing the location of at least one object comprising:
   at least one object;
   at least one communication structure operatively associated with the at least one object;
   a device having a communication range and capable of communicating with the communication structure operatively associated with the at least one object, the device being capable of generating a warning notification; and
   a predetermined proximity distance threshold associated with the at least one object, wherein the warning notification is generated by the device if the at least one object is not detected within the predetermined proximity distance threshold associated with the at least one object in relation to the device; wherein
   the device receives an instruction that the at least one object has permission to not be detected within the predetermined proximity distance threshold associated with the at least one object; wherein
   if the at least one object is determined to not be detected within the predetermined proximity distance threshold, determining whether or not the at least one object not detected within the predetermined proximity distance threshold has permission to not be detected within the predetermined proximity distance threshold; and
   if the at least one object is determined to have permission to not be detected within the predetermined proximity distance threshold, no warning notification is generated by the device; and if after having permission to not be detected within the predetermined proximity distance threshold, the at least one object is detected within the predetermined proximity distance threshold, the permission for the at least one object to not be detected within the predetermined proximity distance threshold is revoked.

7. The system of claim 6 wherein:
if the at least one object is determined not to have permission to not be detected within the predetermined proximity distance threshold, a warning notification is generated by the device.

8. The system of claim 6 wherein, if after permission to not be detected within the predetermined proximity distance threshold is revoked, the at least one object is not detected within the predetermined proximity distance threshold, a warning notification is generated by the device.

9. The system of claim 6 wherein:
if after having permission to not be detected within the predetermined proximity distance threshold, the at least one object is detected within the predetermined proximity distance threshold, permission for the at least one object to not be detected within the predetermined proximity distance threshold is revoked and an alarm is sent to a user.

10. The system of claim 6 wherein the communication structure operatively associated with the at least one object includes at least one of:
a radio frequency identification (RFID) tag, a mobile radio frequency device (M-RFID), a mobile item management and identification system (MIMIS), a real time locating system (RTLS), a global positioning system (GPS), an optical scanner and an ultra-sound identification system (UIS).

11. The system of claim 6 wherein the communication structure operatively associated with the at least one object comprises:
a global positioning system (GPS).

12. A method for managing the location of at least one object comprising:
providing at least one object;
providing at least one communication structure operatively associated with the at least one object;
providing a device having a communication range and being capable of communicating with the communication structure operatively associated with the at least one object within the device communication range, the device being capable of providing a warning notification;
establishing a predetermined proximity distance threshold for the at least one object in relation to the device;
determining whether or not the at least one object exceeds the predetermined proximity distance threshold associated with the at least one object;
determining whether the at least one object has permission to exceed the predetermined proximity distance threshold associated with the at least one object;
providing the warning notification based on the at least one object exceeding the predetermined proximity distance threshold associated with the at least one object if it is determined that the at least one object does not have permission to exceed the predetermined proximity distance threshold associated with the at least one object;
providing a first permission for the at least one object not to be detected within the predetermined proximity distance threshold by deactivating the warning notification to permit the at least one object not to be detected within the predetermined proximity distance threshold such that no warning notification is provided; and
revoking the first permission for the at least one object not to be detected within the predetermined proximity distance threshold when the at least one object is detected having reentered within the predetermined proximity distance threshold by activating the warning notification unless a second permission is provided for the at least one object not to be detected within the predetermined proximity distance threshold.

13. The method of claim 12, further comprising a step of activating the warning notification to determine location of the at least one object that comprises the step of:
moving the at least one object to detect the communication structure.

14. The method of claim 13, wherein the step of moving the at least one object further comprises the step of:
moving the at least one object outside the predetermined proximity distance threshold.

15. The method of claim 14, wherein the step of moving the at least one object further comprises the step of:
moving the at least one communication structure outside the predetermined proximity distance threshold.

16. The method of claim 15 wherein the step of moving the at least one object further comprises the step of:
moving the at least one communication structure inside the predetermined proximity distance threshold.

17. The method of claim 13, wherein the step of moving the at least one object further comprises the step of:
moving the at least one object inside the predetermined proximity distance threshold.

18. The method of claim 12, further comprising the step of activating the warning notification to determine location of the at least one object, wherein the steps of
establishing a predetermined proximity distance threshold for the at least one object; and
activating the warning notification to determine location of the at least one object further comprising the step of:
varying the predetermined proximity distance threshold without moving the device or the at least one object required to activate the warning notification and thus determine the distance between the device and the at least one object.

19. A system for managing the location of at least one object comprising:
at least one object;
at least one communication structure operatively associated with the at least one object;
a device having a communication range and capable of communicating with the communication structure operatively associated with the at least one object, the device being capable of generating a warning notification; and
a predetermined proximity distance threshold associated with the at least one object in relation to the device, wherein the warning notification is generated by the device if the at least one object is not detected within the predetermined proximity distance threshold associated with the at least one object in relation to the device; wherein
a first permission is provided by an instruction to the device for the at least one object not to be detected within the predetermined proximity distance threshold by deactivating the warning notification; and
the first permission is revoked when the at least one object is detected reentering within the predetermined proximity distance threshold by activating the warning notification unless a second permission is provided by an instruction to the device for the at least one object not to be detected within the predetermined proximity distance threshold.

20. The system of claim 19 wherein the communication structure further comprises:
a triangulation structure.

21. The system of claim 20 wherein the triangulation structure includes:
radiolocation triangulation between radio towers.

22. The system of claim 19 wherein the communication structure further comprises:
Doppler shift structure.

23. The system of claim 22 wherein the Doppler shift structure comprises:
Doppler radar.

24. The system of claim 22 wherein the Doppler shift structure comprises:
a structure emitting sound waves.

* * * * *